Dec. 8, 1959     E. J. SCHAEFER     2,915,978

MOTOR PUMP UNIT

Filed April 10, 1956     3 Sheets-Sheet 1

INVENTOR.
Edward J. Schaefer
BY
Dorris Lindsey Hibben & Noyes
Attys

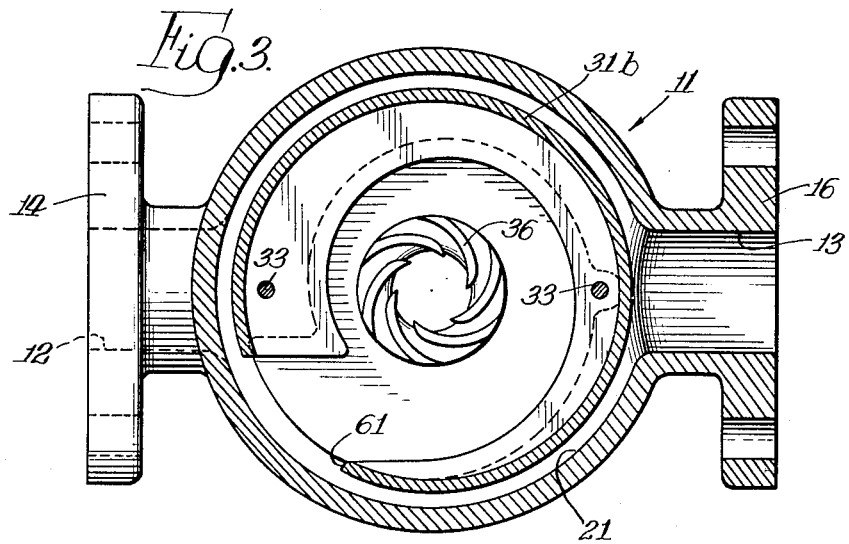
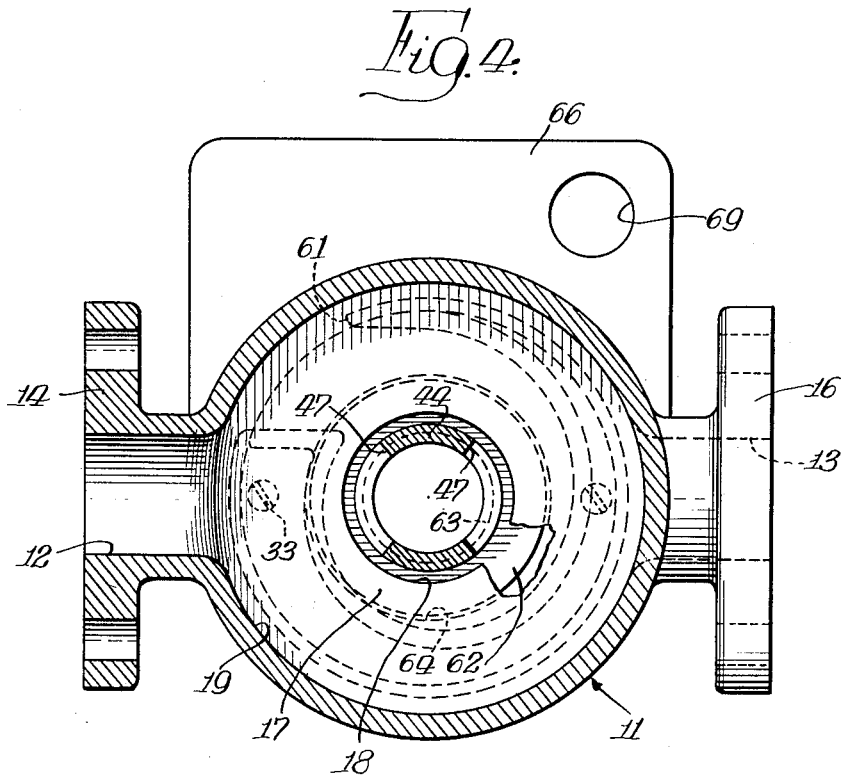

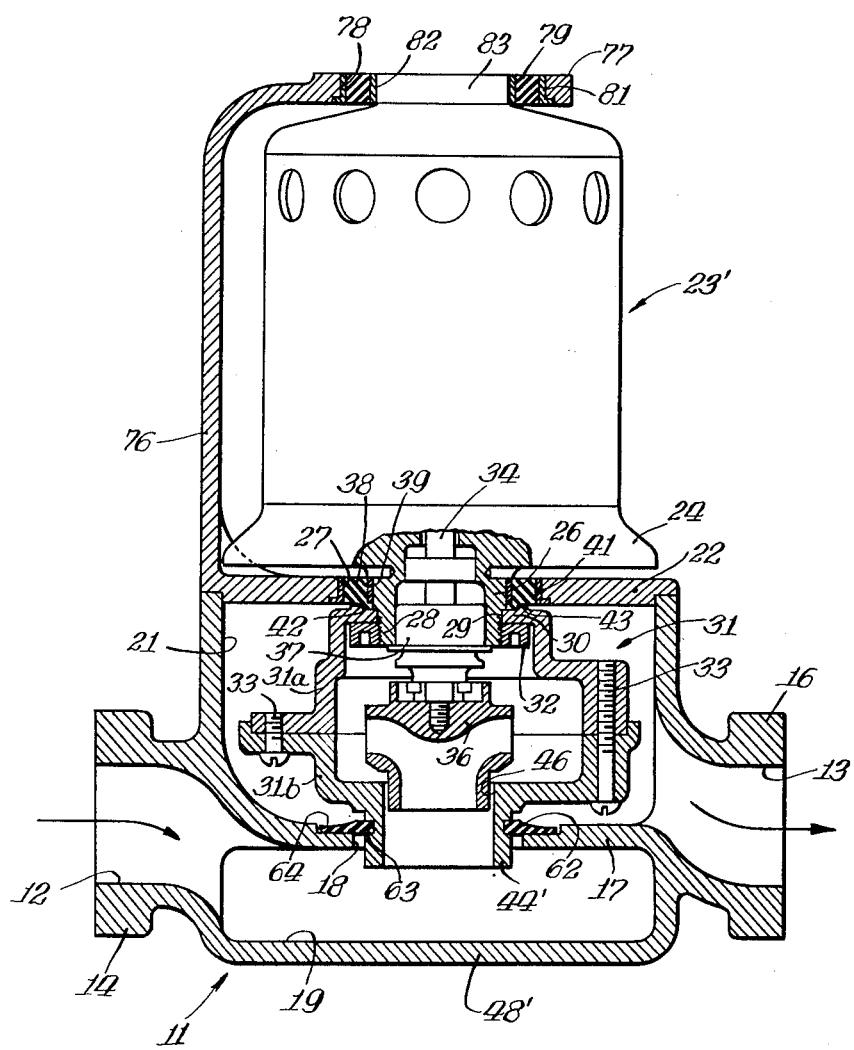

United States Patent Office 2,915,978
Patented Dec. 8, 1959

2,915,978

MOTOR PUMP UNIT

Edward J. Schaefer, Fort Wayne, Ind.

Application April 10, 1956, Serial No. 577,368

20 Claims. (Cl. 103—87)

This invention relates to improvements in motor-pump units, particularly those known in the trade as circulating pumps.

For circulating purposes in home hot water heating systems and the like it is common practice to use a motor-pump unit of the type adapted to be connected directly in a pipe line. With such motor-pump units, quietness of operation is one of the most important considerations. In fact, for home use quiet operation is even more important than the efficiency of the pump. Consequently, it is necessary in all such units to provide some means for minimizing the transmission of vibrations from the motor-pump unit to the piping system and storage tank.

Various resilient or cushion mounting arrangements have been proposed heretofore wherein the resilient cushions are arranged concentrically with the axis of the electric motor as is essential in order to isolate torsional vibration of the motor. For example, reference is made to U.S. Patent No. 2,485,408 to A. R. Pezzillo and my own prior U.S. Patent No. 2,731,918. However, such prior arrangements while producing the desired quiet operation have the disadvantage that the piping sections to which the unit is attached must be aligned rather exactly in order to avoid excessive distortion and strain of the resilient mounting means which is necessarily interposed between the motor-pump unit and the respective pipe sections. Obviously, it would be highly desirable to obtain all of the benefits of a resilient mounting which is concentric with the motor axis while at the same time avoiding the foregoing disadvantage. In addition, it will also be understood that any satisfactory resilient mounting means must prevent the transmission of vibrations and noise without interfering with or sacrificing the mechanical alignment and close clearance requirements characteristic of centrifugal or impeller type pumps.

Accordingly, a primary object of the present invention is to provide a novel and improved motor-pump unit which is characterized by its quietness of operation.

A further object of the invention is to provide, in a motor-pump unit of the type adapted to be mounted directly in a pipe line, novel means for preventing transmission of vibrations and noise from the unit to the pipe line.

Another object of the invention is to provide a novel and improved motor-pump unit of the foregoing type which has resilient mounting means concentric with the motor axis for isolating torsional vibration of the motor and which does not require extreme accuracy of alignment of the piping in order to avoid excessive distortion and strain of the resilient mountings.

An additional object of the invention is to provide a novel and improved motor-pump unit of the foregoing type in which resilient mounting means is provided for minimizing the transmission of vibrations and noise from the unit but without sacrificing the mechanical alignment requirements for the operating portions of the pump.

Other objects and advantages of the invention will become evident from the subsequent detailed description taken in conjunction with the accompanying drawings wherein:

Fig. 3 is a horizontal sectional view looking downwardly along the line 3—3 of Fig. 2;

Fig. 4 is a horizontal sectional view looking upwardly along the line 4—4 of Fig. 2; and Fig. 5 is a view similar to Fig. 2 but showing a modified form of the invention.

Figure 1:
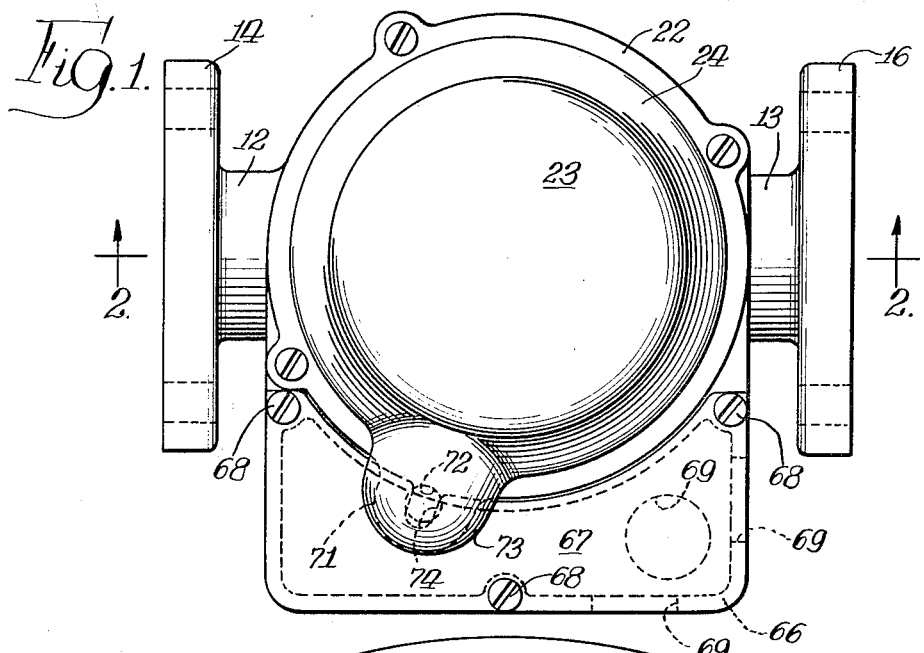
Fig. 1 is a top plan view of a motor-pump unit comprising one specific embodiment of the invention.

Broadly speaking, the invention comprises a motor-pump means having rigidly interconnected frame portions which are in turn mounted on a rigid supporting structure with a plurality of resilient cushions interposed therebetween so as to prevent or minimize the transmission of vibrations from the motor-pump means to the supporting structure. As will hereinafter appear, in the preferred embodiment of the invention the resilient cushions are disposed concentrically with respect to the axis of the motor-pump means, and the supporting structure has means for connecting the device in a pipe line and also provides fluid communication between the pipe line and the pump.

Referring now to the drawings in detail, the illustrated specific embodiment of the invention comprises a rigid support or generally cup-like housing structure designated generally at 11 and having a fluid inlet 12 and a fluid outlet 13 with attaching flanges 14 and 16, respectively, for connecting the device in a pipe line. The hollow interior of the support 11 has an intermediate wall portion or partition 17 with an aperture 18, the partition 17 serving to divide the interior of the support or housing into a lowermost low pressure chamber 19 communicating with the fluid inlet 12 and an uppermost high pressure chamber 21 which communicates with the fluid outlet 13 as hereinafter described in greater detail. A cover plate 22 provides a top wall or closure for the high pressure chamber 21.

An electric motor designated generally at 23 and having a rigid frame with an end bell portion 24 and a hub 26 is disposed with its axis transverse to the axis of flow between the inlet 12 and the outlet 13. Preferably, as shown in the drawings, the motor 23 is arranged on a vertical axis with the support 11 being connected to horizontal piping. The motor hub 26 depends through an opening 27 in the cover 22 and has a threaded extension 28 at its lower end which projects through an opening 29 in the upper end wall 30 of a pump volute casing structure designated generally at 31. A nut 32 is fastened on the threaded extension 28 for clamping the volute casing 31 to the motor hub 26. In this instance, the pump volute 31 has a two-part construction comprising an upper half 31a interfitting with a complementary lower half 31b and retained in assembled relation by means of a plurality of screws 33. The motor shaft, indicated at 34, extends through the hub portion 26 into the volute casing 31 and has mounted at its lower end an impeller 36 disposed in pumping relation at the eye of the volute, as best seen in Fig. 3. A rotary mechanical seal 37 of a conventional type is mounted in the hub extension 28 for protecting the motor 23 from fluid.

For resiliently mounting the rigidly interconnected motor frame and pump volute casing portions a cushion ring 38 of rubber or the like is disposed in the opening 27 in cushioning relation between the motor hub 26 and the cover 22 of the support 11. The rubber ring 38 is contained between a pair of inner and outer concentric metal rings or bands 39 and 41, respectively, for providing a tight frictional fit around the motor hub 26 and within the cover plate aperture 27. For preventing fluid leakage, the rubber ring 38 is formed with an integral projecting thin flange portion 42 which is interposed between the end wall 30 of the volute casing 31 and the lower axial edge of the band 39. The clamping action of the nut 32 causes the rubber flange portion 42 to be compressed between the parts 30 and 39 so as to function as a gasket, and the end wall 30 has a shallow upstanding annular rib 43 which confines the rubber flange portion 42 to enhance the sealing effect.

The lower section 31b of the volute casing 31 is formed with a tubular extension or intake 44 which provides a fluid inlet opening 46 at the eye of the volute, the lower extremity of the pump impeller 36 being received within the opening 46 with a relatively small running clearance therebetween. The extension 44 depends through the opening 18 in the partition 17 and is provided with a plurality of slotted fluid inlet ports 47 within the low pressure chamber 19. The lower end of the extension 44 has a resilient connection with the bottom wall, indicated at 48, of the support 11 by means of a lower cushion ring 49 of rubber or the like. The lower cushion ring 49 has the same general construction as the upper ring 38 heretofore described and includes a pair of inner and outer concentric metal rings or bands 51 and 52, respectively. The inner band 51 has a tight frictional fit around a reduced end portion 53 of an imperforate end wall portion 54 on the tubular extension 44, and the band 52 has a similar tight frictional fit in an opening 56 in the bottom wall 48 of the support 11. The rubber ring 49 is likewise formed with an integral thin projecting flange or gasket portion 57 which is interposed between the end wall structure 54 and the band 51 and is compressed therebetween by the clamping action of a washer 58 which underlies the band 51 and a screw 59 extending through the washer into the end wall structure 54.

Thus, in the illustrated embodiment of the invention, the weight of the vertical axis motor-pump means is fully supported from the cushion rings 38 and 49 with the fluid flow through the support 11 being along a transverse or generally horizontal axis. The location of the cushion rings concentrically with respect to the axis of the motor-pump means is, of course, subject to some variation while still realizing the benefits of the invention. However, the vertically spaced arrangement with the ring 38 in the top wall 22 of the support and the ring 49 in the bottom wall 48 of the support has the important advantage of imparting lateral stability to the resiliently mounted motor-pump means so that the latter is resistant to tilting.

Figure 2:
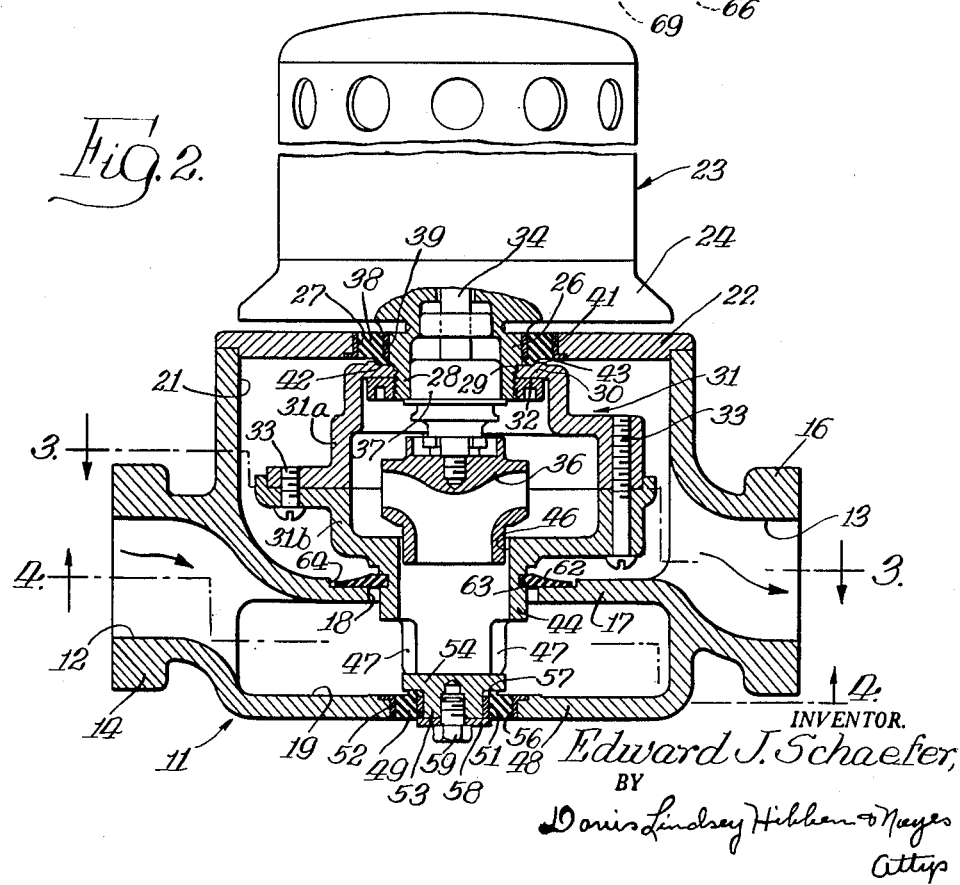
Fig. 2 is a vertical sectional view taken along the line 2—2 of Fig. 1 with the motor portion primarily in elevation.

Referring particularly to Fig. 2, it will be seen that the inlet fluid passing from the inlet 12 to the low pressure chamber 19 flows through the ports 47 and thence upwardly through the tubular extension 44 and the impeller 36 into the interior of the volute casing 31. As best seen in Fig. 3, the discharge fluid passes from the volute through a discharge opening 61 into the high pressure fluid chamber 21 from which it discharges through the outlet 13. In order to separate the low pressure chamber 19 from the high pressure chamber 21 without nullifying the resilient mounting effect of the rings 38 and 49, a flexible rubber gasket or washer 62 is fitted snugly in an annular groove 63 around the outside of the tubular extension 44 and seats in a shallow annular recess 64 which is provided in the upper face of the partition 17 surrounding the aperture 18. As will readily be understood, this flexible washer 62 accommodates vertical and torsional movement of the volute casing 31 but at the same time prevents leakage of fluid from the high pressure chamber 21 to the low pressure chamber 19. The seal provided by the washer 62 need not be absolutely fluid-tight but it will be seen that the higher pressure of the fluid in the chamber 21 tends to press the flexible washer 62 tightly against the recess 64 so that there is little opportunity for leakage. Thus, the seal 62 avoids by-passing or internal circulation of fluid between the chambers 19 and 21 which would obviously result in a lowered pump efficiency.

Referring now to Fig. 1, the support 11 is provided with an integral connector box or housing portion 66 for accommodating the electrical connections from a supply line to the motor 23. The connector box 66 is closed at its upper end by means of a cover 67 detachably secured to the box by a plurality of screws 68. The side and bottom walls of the box 66 are formed with a plurality of openings or knock-out portions 69 by means of which electrical conduits may be rigidly secured to the connector box in the usual manner. Extending radially from the cover plate 22 and overlying the connector box cover 67 is a projection 71 having an aperture 71. Overlying this projection 71 is a complementary hollow projecting portion 73 which extends radially from the motor end bell 24. Thus, the supply wires of the electric cables or conduits (not shown) secured to the connector box 66 may extend from within the box 66 upwardly through an edgewise slot 74 in the connector box cover plate 67 and thence through the aperture 72 in the projection 71 into the hollow projection 73 and into the interior of the motor 23.

Heretofore, it has been the usual practice for the electrical connector box to be rigidly affixed to the motor of the unit. Obviously, if relatively rigid electrical conduits are connected to such a box, the effective resilient mounting of the motor is interfered with and also there is an opportunity for vibrations to be transmitted from the motor to the electrical conduits and possibly resulting in an undesirable noisy operating condition. With the connector box structure described above, any rigid electrical conduit connections are made to the rigid support structure 11 and there is no interference whatsoever with the resilient mounting of the interconnected motor-pump means 23—31.

Referring to Fig. 5, a modified form of the invention is illustrated which is particularly useful in the case of a motor-pump unit having a motor of larger size or higher rating. Although in most cases a motor-pump unit of the type here involved will be of such physical proportions that the motor section is adequately supported by a pair of resilient rings such as the rings 38 and 49 shown in Fig. 2, it may be desirable in some instances to provide an outboard support at the outermost end of the motor section. For example, in a higher horsepower motor unit the axial length of the motor may be so great that an excessive strain would be imposed on a resilient ring mounting such as shown in Fig. 2, particularly if the motor-pump unit is mounted in a horizontal position rather than the vertical position shown in Fig. 2. To accommodate such a condition, I may provide a suitable support at the outboard end of the motor section.

In Fig. 5 the parts which are identical with Fig. 2 have been given the same reference numerals and need not be described again. Thus, the same generally cup-shaped housing structure 11 is employed having the internal partition 17 with the pump volute casing structure 31 disposed in the upper or high pressure chamber 21. However, in this case the fluid intake or extension designated at 44' terminates in an open end just below the partition 17 and the resilient support in the bottom wall of the housing as employed in the Fig. 2 form is entirely eliminated, the bottom wall being continuous and imperforate as shown at 48'. An axially elongated motor section designated generally at 23' is connected to the pump volute casing structure in the same manner as in Fig. 2, and the same resilient ring 38 is interposed between the lower hub 26 of the motor and the cover 22. As an outboard rigid support for the motor 23', the cover 22 is provided with an elongated rigid bracket which in this case is in the form of a saddle extension 76 integral with the cover 22 and projecting therefrom parallel to the motor axis. At its outer end the extension 76 is turned inwardly to provide an end support portion 77 having a central aperture 78 coaxial with the motor 23'. A resilient rubber ring 79 is disposed between a pair of concentric metal bands 81 and 82 in the same general manner as heretofore described in connection with the rings 38 and 49, and the bands 81 and 82 have a tight frictional fit in the aperture 78 and around an end hub 83 on the motor, respectively.

Thus, the rigidly interconnected motor and pump volute casing structure is resiliently mounted on the rigid supporting structure (comprising the housing 11, the cover 22, and the integral bracket 76) by means of the spaced resilient rings 38 and 79 whereby to obtain the same structural and operational advantages previously described in connection with Fig. 2 but at the same time providing greater stability at the outermost end of the motor. Of course it will be apparent that instead of omitting the supporting connection between the volute intake and the bottom wall of the housing, the outboard support ring 79 could also be used in combination with both the ring 38 and the bottom ring 49 shown in Fig. 2 so as to obtain resilient support of the motor and pump volute casing structure at three spaced points on the rigid supporting structure.

From the foregoing, it will be seen that by utilizing a separate rigid support for rigidly interconnected motor and pump frame portions with resilient cushion rings interposed therebetween, I am able to obtain all the advantages of cushion rings which are concentric with the axis of rotation of the motor and pump without the necessity for highly accurate alignment of the piping to which the unit is connected and without imposing any undesirable strain on the resilient cushion rings. As will readily be understood, the resilient cushion rings are capable of preventing or greatly minimizing the transmission of vibrations whether electrical, mechanical, or hydraulic in origin. Furthermore, the advantage of concentric cushion rings in isolating torsional pulsations of the motor is realized with relatively small diameter rings which provide the required torsional flexibility with a reasonable thickness of rubber. Although the resilient cushions may be located in various positions in cushioning relation between the rigid support and the motor-pump means, the use of a pair of cushions in remotely spaced relation is most desirable, as described above, in order to impart lateral stability to the resiliently supported motor-pump means.

In the preferred embodiment of the invention as herein specifically described, the motor-pump means is mounted on a vertical axis which is transverse to the direction of flow of the pumped fluid. With such arrangement, the full weight of the motor-pump means is carried by the resilient cushions. However, by utilizing rigidly interconnected motor and pump frame portions with the resilient cushions interposed between said frame portions and the rigid outermost support, I am able to obtain the desired resilient mounting of the motor-pump means without interfering in any way with the maintenance of proper operating clearances in the operating portion of the pump. For example, in a centrifugal pump of the type herein illustrated, an accurate running clearance of not more than .01 inch must frequently be maintained. With the arrangement shown the entire motor-pump means may move vertically or torsionally relative to its rigid support but there is no sag or change of operating position of the pump impeller relative to the pump volute.

Although the invention has been described with particular reference to certain specific structural embodiments thereof, it is to be understood that various modifications and alternative structures may be resorted to without departing from the scope of the invention as defined in the appended claims.

I claim:

1. A motor-pump unit comprising a rigid housing having fluid inlet and outlet means adapted to be connected to piping, motor-pump means including rigidly interconnected motor frame and pump casing portions carried by said housing, said pump casing portion having inlet and outlet openings and being located within said housing, and resilient cushion means interposed between said housing, and at least one of said portions, said resilient cushion means supporting the weight of said motor-pump means and retarding transmission of vibrations from said motor-pump means to said housing.

2. A motor-pump unit comprising a rigid support comprising a housing having rigidly connected fluid inlet and outlet means adapted to be connected to piping, motor-pump means including rigidly interconnected motor frame and pump volute casing portions mounted on said support with said motor frame portion located exteriorly of said housing and said casing portion located within said housing, and resilient cushion means interposed between said support and at least one of said rigidly interconnected portions for supporting the weight of said motor-pump means and retarding transmission of vibrations from the motor-pump means to the support.

3. The structure of claim 2 further characterized in that said cushion means is located adjacent the interconnection of said portions and includes at least one resilient ring concentric with the axis of rotation of said motor-pump means.

4. The structure of claim 2 further characterized in that said cushion means comprises a pair of resilient elements coacting between said support and said motor-pump means in spaced relation from each other for imparting lateral stability to said motor-pump means relative to said support while at the same time permitting limited resilient movement of the motor-pump means relative to said support.

5. A motor-pump unit comprising a support comprising a housing having rigidly interconnected spaced portions, at least one of said spaced portions being a wall, motor-pump means including rigidly interconnected frame structure mounted on said support with the motor located exteriorly of said housing and the pump located within said housing, cushion means concentric with the axis of rotation of said motor-pump means and interposed between said frame structure and said wall for supporting the weight of said motor-pump means and retarding transmission of vibrations to said support, and resilient means coacting between said frame structure and the other of said spaced portions in remote spaced relation from said cushion means for imparting lateral stability to said motor-pump means.

6. A motor-pump unit comprising a rigid cup-like support having a fluid inlet and outlet adapted to be connected to piping, a pump having a volute casing disposed within said support and having an inlet eye portion in communication with said fluid inlet and a discharge portion in communication with said fluid outlet, a motor located exteriorly of said support and having a frame projecting into said support and rigidly connected at its inner portion to said casing, and resilient cushion means interposed between said support and the rigidly interconnected pump casing and motor frame for resiliently mounting the motor and pump and retarding transmission of vibrations to said support.

7. A motor-pump unit comprising a rigid cup-like support having a top wall portion and laterally extending fluid inlet and outlet means adapted to be connected to horizontal piping, a pump having a volute casing structure disposed within said support and having an inlet eye portion in communication with said fluid inlet means and a discharge portion in communication with said fluid outlet means, a motor located above said support and having a rigid frame with a hub portion extending downwardly through the top wall portion of said support and rigidly connected to said casing structure, the axis of said motor and said pump being transverse to the axis of flow through said inlet and outlet means, and cushion mounting means for resiliently mounting the motor and pump on said support and retarding transmission of vibrations to the support, said cushion mounting means including a resilient ring interposed between the hub portion of said motor frame and the top wall portion of said support.

8. A motor-pump unit comprising a rigid cup-like support having vertically spaced upper and lower horizontal wall portions and laterally extending oppositely disposed fluid inlet and outlet means adapted to be connected to horizontal piping, a pump having a volute casing structure disposed within said support and having an inlet eye portion in communication with said fluid inlet means and a discharge portion in communication with fluid outlet means, a motor located above said support and having a rigid frame with a hub portion extending downwardly through the upper horizontal wall portion of said support and rigidly connected to said casing structure, the axis of said motor and said pump being transverse to the general direction of fluid flow between said inlet and outlet means, and cushion mounting means for resiliently mounting the motor and pump on said support and retarding transmission of vibrations to the support, said cushion mounting means comprising a first resilient ring interposed between the hub portion of said motor frame and said upper horizontal wall portion of said support and a second resilient ring interposed between said casing structure and said lower horizontal wall portion of said support.

9. A motor-pump unit comprising a rigid support comprising a housing, a partition having an opening therein and dividing said housing into a low pressure chamber and a high pressure chamber, fluid inlet means and fluid outlet means on said housing communicating with said low pressure and said high pressure chambers, respectively, and adapted to be connected to piping, motor-pump means resiliently mounted on said support and including a motor located exteriorly of said housing and a pump volute casing structure disposed within said high pressure chamber and having a discharge communicating through said high pressure chamber with said outlet means, a fluid intake portion extending from the pump volute through the opening in said partition into said low pressure chamber for communication with said inlet means, spaced cushions disposed between said support and said motor-pump means, and a flexible seal coacting between said partition and said intake portion for substantially preventing fluid flow from said high pressure chamber to said low pressure chamber without interfering with the resilient mounting of said motor-pump means on said support.

10. The structure of claim 9 further characterized in that said seal comprises an annular element of resilient flexible material fitted around said intake portion and coacting with said partition for substantially sealing the opening therein.

11. A motor-pump unit comprising a rigid support comprising a housing having spaced wall portions, a partition between said wall portions dividing the interior of said housing into a low pressure chamber and a high pressure chamber, fluid inlet means and fluid outlet means on said support communicating with said low pressure and said high pressure chambers, respectively, and adapted to be connected to piping, motor-pump means including rigidly interconnected motor frame and pump volute casing portions mounted on said support, said motor frame portion being located exteriorly of said housing, said pump volute casing portion being disposed within said high pressure chamber and having a discharge communicating through said high pressure chamber with said outlet means and a fluid intake portion extending from the pump volute through said partition into said low pressure chamber for communication with said inlet means, a pair of resilient cushions interposed between the respective wall portions and said rigidly interconnected portions for supporting the weight of said motor-pump means and retarding transmission of vibrations from the motor-pump means to the support, and a flexible seal coacting between said partition and said intake portion for substantially preventing fluid flow from said high pressure chamber to said low pressure chamber without interfering with the resilient mounting of said motor-pump means on said support.

12. A motor-pump unit comprising a rigid support having a hollow cup-like interior with a top wall portion and laterally extending fluid inlet and outlet means adapted to be connected to horizontal piping, a partition having an opening therein and dividing said interior into a low pressure chamber communicating with said fluid inlet means and a high pressure chamber communicating with said fluid outlet means, a pump having a volute casing structure disposed within said high pressure chamber and having a discharge communicating through said high pressure chamber with said outlet means, a motor located above said support and having a rigid frame with a hub portion extending downwardly through the top wall portion of said support and rigidly connected to said casing structure, the axis of said motor and said pump being transverse to the axis of flow through said inlet and outlet means, a fluid intake extending from the pump volute through the opening in said partition into said low pressure chamber for communication with said inlet means, cushion mounting means for resiliently mounting the motor and pump on said support and retarding transmission of vibrations to the support, said cushion mounting means including a resilient ring interposed between the hub portion of said motor frame and the top wall portion of said support, and a flexible seal coacting between said partition and said intake portion for substantially sealing the opening in said partition and thereby preventing fluid flow from said high pressure chamber to said low pressure chamber without interfering with the resilient mounting of said motor and said pump on said support.

13. A motor-pump unit comprising a rigid support having a hollow cup-like interior with upper and lower horizontal wall portions and laterally extending fluid inlet and outlet means adapted to be connected to horizontal piping, a partition having an opening therein and extending across the interior of said support for defining with said lower horizontal wall portion a low pressure chamber communicating with said fluid inlet means and defining with said upper horizontal wall portion a high pressure chamber communicating with said fluid outlet means, a pump having a volute casing structure disposed within said high pressure chamber and having a discharge communicating through said high pressure chamber with said outlet means, a motor located above said support and having a rigid frame with a hub portion extending downwardly through said upper horizontal wall portion of said support and rigidly connected to said casing structure, the axis of said motor and said pump being transverse to the axis of flow through said inlet and outlet means, a tubular fluid intake extending from said casing structure through the opening in said partition into said low pressure chamber for communication with said inlet means, cushion mounting means for resiliently mounting the motor and pump on said support and retarding transmission of vibrations to the support, said cushion mounting means comprising a first resilient ring interposed between the hub portion of said motor frame and said upper horizontal wall portion and a second resilient ring interposed between said tubular fluid intake and said lower horizontal wall portion, and a flexible seal comprising an annular element of resilient flexible material fitted around said tubular intake and coacting with said partition for substantially sealing the opening therein whereby to prevent fluid flow from said high pressure chamber to said low pressure chamber without interfering with the resilient mounting of said motor and said pump on said support.

14. A motor-pump unit comprising a rigid cup-like support having a fluid inlet and outlet adapted to be connected to piping, a pump having a volute casing disposed within said support and having an inlet eye portion in communication with said fluid inlet and a discharge portion in communication with said fluid outlet, a motor located exteriorly of said support and having a frame projecting into said support and rigidly connected to said casing, resilient cushion means interposed between said support and the rigidly interconnected pump casing and motor frame for resiliently mounting the motor and pump and retarding transmission of vibrations to said support, and an electrical connector box adapted to have rigidly connected thereto an electrical conduit comprising wires for supplying electrical energy to the motor, said connector box being rigidly mounted on the outside of said support whereby the conduit cannot interfere with the resilient mounting of the motor and pump and whereby said cushion means also retards transmission of vibrations to the conduit.

15. A motor-pump unit comprising a rigid support including rigidly connected fluid inlet and outlet means adapted to be connected to piping, motor-pump means including rigidly interconnected motor frame and pump volute casing portions mounted on said support, said motor frame portion extending at one end thereof into said support and projecting outwardly from said support, an elongated supporting bracket extending outwardly and rigidly from said support, first resilient cushion means interposed between said support and at least one of said portions adjacent said end of said motor frame portion for retarding transmission of vibrations from said motor-pump means to said support, and second resilient cushion means interposed between the outer end of said bracket and said motor frame portion for resiliently supporting the latter at its outer end.

16. A motor-pump unit comprising a rigid cup-like support having a cover portion and fluid inlet and outlet means adapted to be connected to piping, a pump having a volute casing structure disposed within said support and having an intake and a discharge communicating with the fluid inlet and outlet means, respectively, a motor having a rigid frame with a first hub portion at one end thereof extending through the cover portion of said support and rigidly connected to said casing structure and a second hub portion at the opposite end of the frame spaced outwardly from said cover portion, an elongated supporting bracket extending outwardly and rigidly from said cover, and cushion mounting means for resiliently mounting the motor and pump on said support and for retarding transmission of vibrations to the support, said cushion mounting means including a first resilient ring interposed between said first hub portion and said cover portion and a second resilient ring interposed between said second hub portion and the outermost end of said bracket.

17. A motor-pump unit comprising a rigid support comprising a housing having fluid inlet and outlet means adapted to be connected to piping, motor-pump means including rigidly interconnected motor frame and pump volute casing portions, said pump volute portion having inlet and outlet openings, and resilient cushion means interconnecting said support and said rigidly interconnected portions, said portions being connected to said support solely by said cushion means with said pump volute portion disposed within said housing and its inlet and outlet openings in operative relation to said inlet and outlet means.

18. The structure according to claim 17 in which said cushion means comprises at least one resilient ring encircling one of said portions and interconnecting said one portion and said support.

19. The structure according to claim 17 in which said cushion means includes a resilient ring encircling said pump volute casing portion and interconnecting said casing portion and said housing, and in which said ring has an integral sealing portion in circumferential engagement with said casing portion adjacent an end thereof for preventing fluid leakage from said housing at said ring.

20. The structure according to claim 17 in which said motor frame and pump volute casing portions are axially aligned and in which said cushion means comprises a pair of resilient rings spaced from each other axially of said portions.

References Cited in the file of this patent

UNITED STATES PATENTS

| | | |
|---|---|---|
| 2,114,780 | Juelson | Apr. 19, 1938 |
| 2,139,373 | McKinley et al. | Dec. 6, 1938 |
| 2,360,211 | Doughman | Oct. 10, 1944 |
| 2,485,408 | Pezzillo | Oct. 18, 1949 |
| 2,514,865 | Hornschuch | July 11, 1950 |
| 2,531,342 | Metz | Nov. 21, 1950 |
| 2,620,151 | Peters | Dec. 2, 1952 |
| 2,624,286 | Smith | Jan. 6, 1953 |
| 2,656,097 | Sheahan | Oct. 20, 1953 |
| 2,731,918 | Schaefer | Jan. 24, 1956 |
| 2,762,311 | Litzenberg | Sept. 11, 1956 |

FOREIGN PATENTS

| | | |
|---|---|---|
| 394,629 | Great Britain | Jan. 29, 1933 |